UNITED STATES PATENT OFFICE.

DANA SLADE, OF CHICAGO, ILLINOIS.

IMPROVEMENT IN COMPOUNDS FOR TREATING CATARRH, &C., BY INHALATION.

Specification forming part of Letters Patent No. 112,858, dated March 21, 1871; reissue No. 4,445, dated June 27, 1871.

*To all whom it may concern:*

Be it known that I, DANA SLADE, of Chicago, in the county of Cook and State of Illinois, have invented a certain new and useful Medical Inhalent for the Cure of Catarrh, Sore Throat, Bronchitis, and other similar diseases.

My invention consists in the employment and combination of carbolic acid with either or both of the ingredients hereinafter mentioned in an inhalent for medicinal purposes. The important sanitary properties of carbolic acid, when judiciously employed for medical purposes, are well known. It may be used either in combination with one or both of the ingredients hereinafter mentioned, or it may be combined with any other suitable ingredients that will produce beneficial effects, and also serve to adapt its use to different diseases, and even in some cases to different stages and individual peculiarity of a given disease. I design to use, either with carbolic acid or cochineal, or in combination with other ingredients with which it will unite to form a useful and effective medical inhalent, the salt known as chlorate of potash. The valuable results arising from the use of this ingredient are well known. Its uses as or in an inhalent adapts it to be employed in diseases like catarrh, &c. When the two ingredients mentioned are combined with cochineal, for the purpose stated, I have found by experience that the following method of preparation and proportions are desirable, viz.: In about two ounces of water at a temperature of 72° Fahrenheit, mix forty grains of carbolic acid, two grains of chlorate of potash, and one grain of cochineal. The mixture should then be well shaken and put into air-tight vessels. In use, water or other liquid should be employed to weaken the solution, in the proportion of about one tea-spoonful of the latter to two ounces of the diluting liquid, which liquid at the time of use should be nearly at the temperature of 200° Fahrenheit. The nature and severity of the case to be treated can alone govern the exact strength of the solution.

This inhalent may be applied in any of the ordinary ways.

I do not confine myself to the process above described, but, on the contrary, distinctly affirm that any desired combination, proportion, or method of preparation may be employed, to adapt the inhalent to different kinds and stages of disease.

What I claim as my invention, and desire to secure by Letters Patent, is—

1. The use of carbolic acid in combination with chlorate of potassa in an inhalent for medical purposes.
2. The combination of carbolic acid, cochineal, and chlorate of potassa in an inhalent for medicinal purposes.
3. The combination of chlorate of potassa and cochineal in an inhalent for medicinal purposes.
4. The combination of cochineal and carbolic acid in an inhalent for medicinal purposes.

In witness whereof I have hereunto signed my name in the presence of two subscribing witnesses.

DANA SLADE.

Witnesses:
S. E. HURLBUT,
L. SUMMERFIELD.